United States Patent [19]
Fister et al.

[11] 3,740,069
[45] June 19, 1973

[54] VEHICLE TANDEM AXLE SUSPENSION SYSTEM

[75] Inventors: Louis P. Fister, St. Louis, Mo.; Lawrence H. Fitch, Cahokia, Ill.; George K. Jeney, St. Louis; William A. Scheublein, Ballwin, both of Mo.

[73] Assignee: Moog Industries, Inc., St. Louis, Mo.

[22] Filed: Mar. 29, 1971

[21] Appl. No.: 128,880

[52] U.S. Cl. .......................... 280/104.5 R, 267/19 A
[51] Int. Cl. .............................................. B60g 5/04
[58] Field of Search ........................... 280/104.5 R; 267/19 A, 19 R

[56] References Cited
UNITED STATES PATENTS

| | | | |
|---|---|---|---|
| 3,653,455 | 4/1972 | Hetteen | 280/104.5 R |
| 3,337,235 | 8/1967 | Willetts | 280/104.5 R |
| 2,774,604 | 12/1956 | Rendel | 280/104.5 R |
| 3,011,795 | 12/1961 | Cox | 280/104.5 R |

*Primary Examiner*—Philip Goodman
*Attorney*—Gravely, Lieder & Woodruff

[57] ABSTRACT

A tandem axle suspension system for a vehicle load bearing frame in which the wheels and axles are caused to move relatively away from each other or toward each other an is so moving a suspension spring device connecting the wheel and axle assemblies is caused to resist such movement in tension or compression. The axles are linked to the load bearing frame in a manner to allow the axles to swing or pivot relative to the frame thereby converting the vertical motion imposed on the frame into torsional reaction as well as horizontal motion of the axles. The torsional reaction in the axles assists the suspension spring and the torque in the axle and the suspension spring together are effective to support the load and take care of wheel motion. The spring in this context is caused to undergo a variable rate of resistance approaching the strength of the spring material in tension or compression, but before the spring material is stressed to its maximum the axles reach a position where there is no further possible relative motion. Thus, the spring device becomes a strike out bumper. In this system the spring device reaches its maximum stressed condition before the links connected to the axles swing to a horizontal position thereby preventing the frame from striking the axles.

6 Claims, 11 Drawing Figures

PATENTED JUN 19 1973 3,740,069

VEHICLE TANDEM AXLE SUSPENSION SYSTEM

BRIEF SUMMARY OF THE INVENTION

This invention relates to a vehicle suspension system in which tandem axles supported by ground engaging wheels carries the vehicle load bearing frame, and spring means is applied directly between the axles to resist vertical loading in combination with the torsional reaction of the axles when the wheels move differentially from side to side.

In conventional vehicle suspension systems, the springs are connected between the sprung and unsprung masses such as the frame and axles. Because of this conventional construction, the vertically acting loads on the vehicle frame will produce bending movements on the springs. As the vertically acting loads are increased, the springs can be easily overstressed in bending, especially under dynamic conditions. Taking the above into consideration, the springs must be designed heavy enough to avoid being overstressed under dynamic conditions. This means that the springs must be designed for relatively low working tresses thereby making for less use of the material than is economical.

The present vehicle suspension system embodies an arrangement where the sprung and unsprung masses, such as the axles and frame, are connected by linkages, and the suspension springs are connected directly to the axles. In this new arrangement the vertical load applied to the frame is transferred through the linkage to move the axles in a horizontal direction, as well as to cause the axles to respond in torsion as the wheels on a common axle lift or move angularly different distances. This new result on axle movement is caused to stress the springs in either tension or compression depending on the direction of relative axle movement.

Because of the new construction, the springs are subjected to tension or compression loads. The bending stresses in a leaf spring will depend on the deflection needed to move the free arch to a flat condition; after which it cannot be over-stressed in bending regardless of the magnitude of the static and/or dynamic forces. Furthermore, it requires much more force to flatten out a leaf spring by the application of force in tension than in bending. Consequently, far less spring material is required to support a given load with this new construction.

The objects of this invention are to convert the vertical loading on the vehicle into generally horizontal movement of the axles, to avoid subjecting the suspension springs to bending forces, to obtain variable rate responses in the suspension springs so that the maximum rate approaches the strength of the material of the springs, and to utilize the springs more efficiently coupled with their use as strike-out bumpers to prevent the frame striking the axles.

Other objects and advantages of this new vehicle axle to frame suspension system will be described in connection with certain preferred embodiments which generally comprise a load bearing frame, a pair of wheel and axle assemblies in tandem for transporting the frame, and a suspension assembly between the frame and axles including resilient means to resist generally horizontal displacement of the axles in response to vertical displacement of the frame under static and dynamic load conditions.

BRIEF DESCRIPTION OF THE DRAWINGS

The preferred embodiments of the present vehicle suspension system are illustrated in the accompanying drawings, wherein.

DESCRIPTION OF THE EMBODIMENTS

Figure 1:
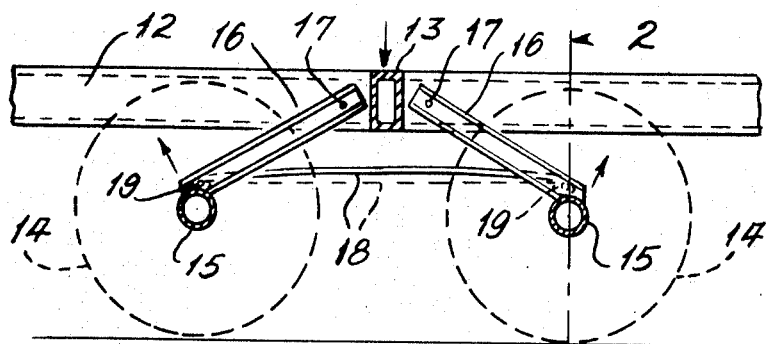
FIG. 1 is a fragmentary elevational view of a vehicle frame having one form of suspension system illustrative of the principle of this invention.

A preferred embodiment of the present invention is shown in fragmentary elevation in FIG. 1, and since the suspension system relates to wheeled vehicles having a load bearing frame which is generally symmetrical on each side of a longitudinal center line, it will be necessary only to disclose a typical assembly with respect to the wheel supported axles at one side of the longitudinal center line. It is understood, of course, that the usual vehicle axle is supported adjacent its opposite ends by suitable wheels which may include pneumatic tires. With this understanding the vehicle of FIG. 1 includes the longitudinal frame side member 12 which may have several transverse frame members such as the one shown at 13. The frame members 12 and 13 are adapted to support the load imposed on the vehicle and which is to be transported over a road surface by the wheels 14 mounted each on the end of an axle 15.

In the present disclosure the wheels 14 and axles 15 are arranged in tandem and are connected by a suspension assembly which includes load transmitting arms 16 having one end of each thereof suitably pivotally connected by pivot pins 17 to the longitudinal side frame member 12. The opposite ends of each of the load transmitting suspension arms 16 is welded or otherwise fixed to the axle 15. The suspension assembly includes resilient means in the form of a single leaf spring 18 which has its opposite ends formed with eyes 19 for the purpose of securing these ends either to the suspension arms 16 or directly to the axles 15.

Figure 2:
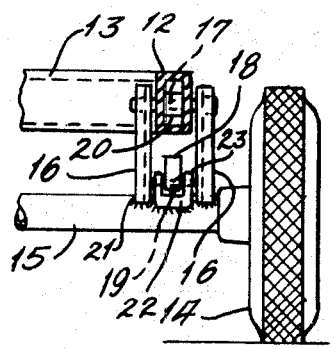
FIG. 2 is a fragmentary sectional view of the system seen at line 2—2 in FIG. 1.

In FIG. 2 a preferred assembly detail may be seen in which the pivot pin 17 extends through the frame side member 12 in a bushing 20 so that its opposite ends pivotally support the upper ends of a pair of suspension arms 16 which are welded at 21 to the axle 15 in spaced relation. Between the suspension arms 16 there is secured by welding to the axle 15 a yoke 22 with opposed upstanding flanges for the purpose of receiving a suitable pivot pin 23 which extends through the eye 19 of the resilient leaf spring 18. Each eye of the spring 18 is mounted in a manner similar to that shown in FIG. 2. It is, of course, understood, but not shown, that the pivot pin 23 must be capable of being removed and, therefore, the suspension arms 16 are provided with apertures in alignment with the position of the pivot pin 23 for purposes of assembly and disassembly.

Figure 3:
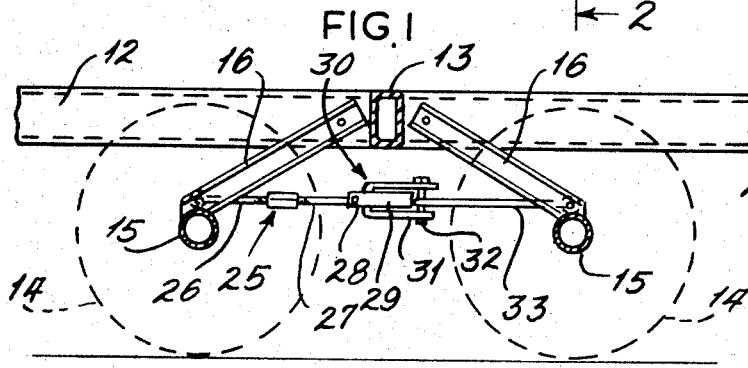
FIG. 3 is a view similar to FIG. 1, but illustrating another embodiment of the invention.
Figure 4:
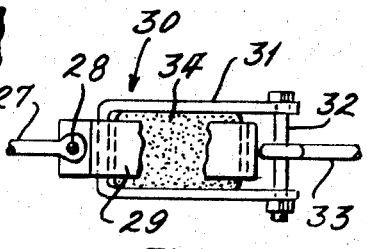
FIG. 4 is a fragmentary detail view of the suspension spring in FIG. 4, but in greatly enlarged scale.

Turning now to FIGS. 3 and 4, it is understood that wherever parts are similar to those described in FIGS. 1 and 2, the same reference numerals will be applied. In these views of the disclosure the resilient leaf spring 18 of FIG. 1 is replaced by a resilient device which includes an adjustment turn buckle 25 having two opposite links 26 and 27 arranged with the link 26 connected at one axle 15 adjacent the suspension arm 16 and the opposite link 27 formed with an eye 28 connected to one part 29 of a resilient unit 30. A member 31 similar to member 29 is provided with a pin 32 which connects it to the eye of a link 33 whose opposite end is connected to the axle 15 adjacent the lower end of suspension arm 16.

Each of the members 29 and 31 is in the form of a U-shaped strap which are interconnected by placing the straps at 90° to each other. When assembled in this manner the straps 29 and 31 provide a suitable cage for the reception of a block of rubber 34 or other suitable resilient material which has an initial unstressed length (FIG. 4) for holding the caging straps 29 and 31 at a suitable expanded position of overlap. In operation, as the respective axles 15 tend to move apart the straps 29 and 31 tend to pull apart and thereby compress the resilient block 34 caged thereby.

Figure 5:
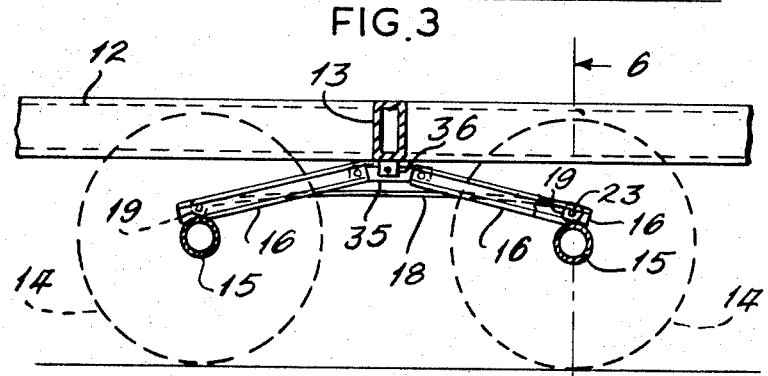
FIG. 5 is a view similar to FIG. 1, but illustrating still another embodiment of the invention.
Figure 6:
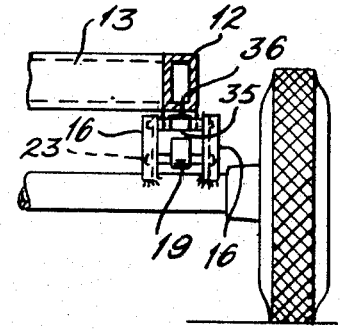
FIG. 6 is a fragmentary sectional view taken at line 6—6 in FIG. 5.

In FIGS. 5 and 6 the suspension arms 16, instead of being pivotally connected directly to the frame side member 12, are pivotally connected to an equalizer link 35 which in turn is pivotally connected by a suitable bracket 36 to the under-side of the side frame 12. In other respects the embodiment of a suspension assembly is similar to that of FIGS. 1 and 2 wherein a single leaf spring 18 is arranged to resist the relative horizontal spreading movement of the axles 15. However, the eye 19 of the spring 18 is connected by a pin 23 directly to the adjacent arms 16. Either way of connecting the spring eyes may be used (See FIGS. 2 and 6).

Figure 7:
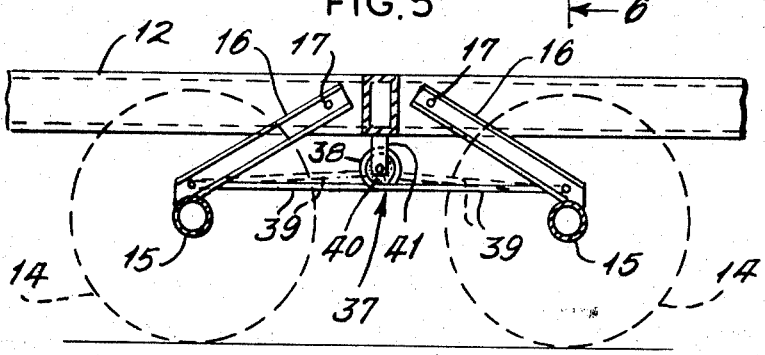
FIG. 7 is a view similar to FIG. 1, but showing a further embodiment of the invention.

The suspension assembly shown in FIG. 7 differs from the assemblies of FIGS. 2 and 5 in that the leaf type suspension spring 18 is now replaced by a torsion spring 37 having a coil body 38 and oppositely directed arms 39 which are connected to the lower ends of the suspension arms 16. The arms 16 are pivotally mounted at the upper end to the side frame 12. The support 41 is intended to prevent lateral whipping or displacement of the coil 38. The core 40 is made of a material which will compress and expand with the enlargement and reduction of size of the coil 38 due to the relative displacement of the axles 15 in response to changing loads on the frame 12. Also, the core 40 may be a solid body having a smaller diameter than the internal diameter of the coil 38 to allow limited reduction in the size of the coil 38 to avoid overstressing the coil 38.

Figure 8:
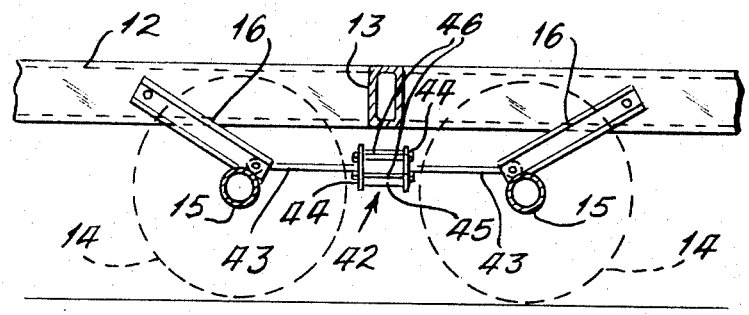
FIG. 8 is a view similar to FIG. 1, but of still another embodiment.

In FIG. 8 there is shown a further embodiment of the present suspension assembly, wherein the side frame member 12 supports suspension arms 16 as before, and the arms are respectively connected to the axles 15. This embodiment shows the suspension arms directed to be angularly convergent and they are retained in the convergent position by resilient device 42 which includes oppositely directed links 43 connected by suitable means to the lower ends of the suspension arms 16, and the inwardly directed ends thereof are connected to compression plates 44 held initially in expanded position by a body 45 of resilient material such as rubber. The resilient body 45 may be bonded or otherwise secured to one of the compression plates and the compression plates are held in initial assembly by a plurality of circumferentially spaced tie rods 46. The tie rods 46 are intended to limit the separation of the compression plates 44 but to impose no limitation or impediment upon the advance of the compression plates toward each other.

Figure 9:
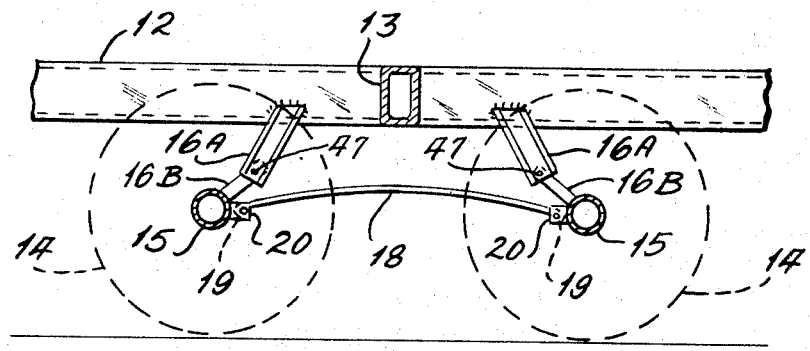
FIG. 9 is a view similar to FIG. 1, but showing another embodiment of the invention.

A still further embodiment of the present suspension assembly is seen in FIG. 9 where the side frame member 12 supports two-part suspension arms in which the upper part 16a is rigidly attached to the side frame 12 and the lower part 16b is pivotally connected to the outer or lower end portion of the suspension arm 16a and rigidly secured to the adjacent axle 15. The pivotal connection between the two parts of the suspension arms is effected by a suitable pin 47 extending between the laterally spaced suspension arm portions 16a. The suspension assembly also includes a resilient member in the form of a leaf spring 18 having its opposite end eyes 19 engaged in mounting brackets 20 which are secured to the respective axles 15.

Figure 10:
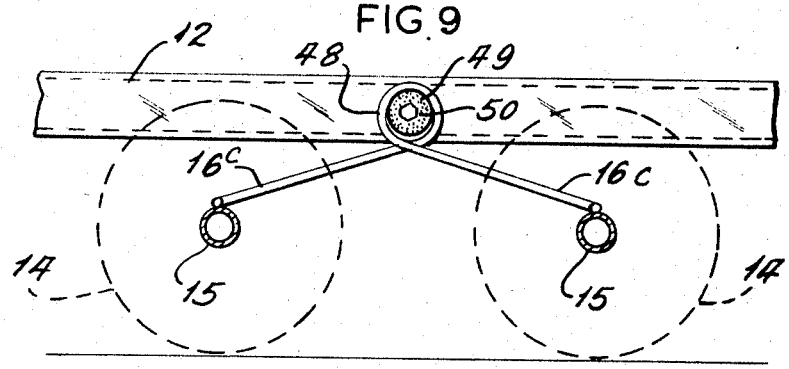
FIG. 10 is still another embodiment of the invention shown in fragmentary elevation.

In FIG. 10 the suspension system for supporting the side frame 12 from the spaced axles 15 includes a suspension assembly consisting of the oppositely directed arms 16c suitably attached at their outer ends to the respective axles 15 and connected at the inner ends to the side frame 12 by means of the resilient coil body 48 engaged about a core 49 secured by an anchor pin 50 to the side frame 12. The resilient material of the coil body 48 in conjunction with the core 49 develops the required resistance to relative movement of the axles 15.

Figure 11:
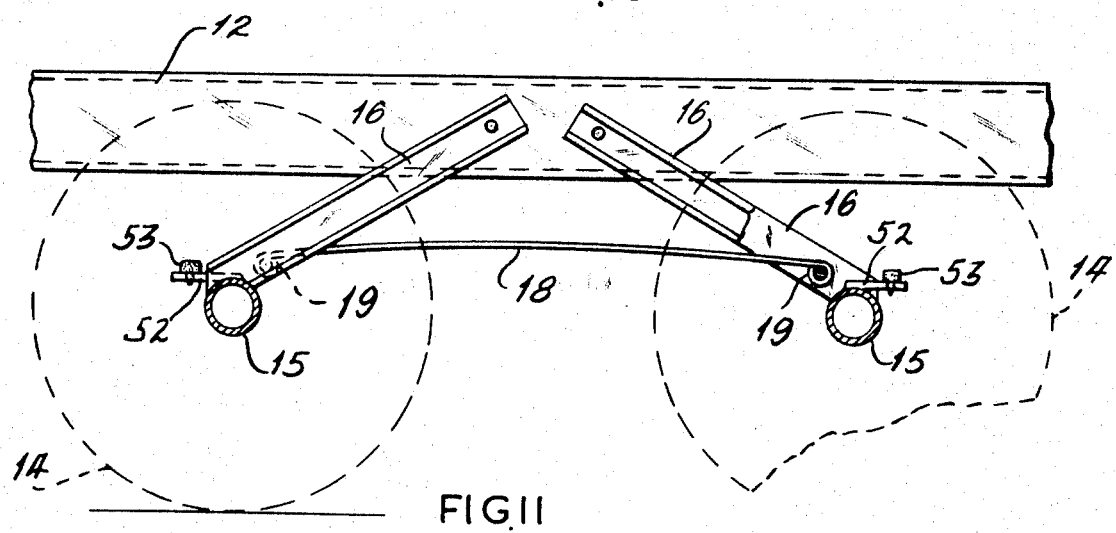
FIG. 11 is a view similar to FIG. 1 showing a modification for limiting torque effects on the axles of the vehicles.

The modification of FIG. 11 has been included to show a way of overcoming deformation of the axles 15 when it is desired to have a minimum clearance between the axles and the frame 12. Reference numerals of FIG. 1 will apply to FIG. 11 for all similar parts. The modification includes providing a bracket 52 on each axle between the links 16, which bracket extends toward the outside. A bumper element 53 is secured to the bracket to act as a striker and to exert a counter torque load on the axle end portion which off sets the dynamic force on an axle when the wheel 14 is forced or driven upwardly toward the frame 12 by a road condition. For example, it is possible for the lead wheel 14 to hit a hump before the trailing wheel does so. The lead wheel forces the lead axle 15 toward the frame 12 before the trailing axle 15 has responded in any way. The spring 18 thus can swing in an arc that does not check the lead axle in its upward movement before it strikes the frame. This result has been found to bend the axle. However, by incorporating the brackets 52 and resilient elements 53 in the manner shown, the force tending to bend the axles will be counteracted by a force in opposition so the axle is not bent or damaged. This same principle can be applied to any of the embodiment herein shown.

OPERATION

Throughout the views of the drawings it is recognized that the principle of operation of the vehicle suspension system involves means for supporting a vertically directed load because of gravitational influence, and a suspension system which translates or converts the vertical loading effect into relative horizontal displacement of the wheel supported axles, together with resilient means to resist the wheel and axle displacement. This general principle runs throughout all of the various preferred embodiments. However, while most of the embodiments have the resilient resisting means effectively connected between the axles, the suspension assembly of FIG. 10 differs to the extent that the resilient resisting means exerts its influence directly through the distal end portions of the suspension arms on the axles while being connected to the side frame member 12.

Some of the embodiments, as FIGS. 1, 3, 5, 7 9 and 10 are arranged so that as the vertical load on the frame increases the respective tandem axles tend to move further apart in a generally horizontal direction. This action calls for resilient means which can either be in tension or compression. The suspension springs of FIGS. 1, 5, 7 and 9 are subjected to tension loads, and those spring means of FIGS. 3 and 8 are subjected to compression loads.

In the foregoing disclosure the suspension assembly operates in a condition in which the tandem axles are forced to move relative to each other and in a generally horizontal direction with vertical directed load conditions and the resilient members are designed to resist the horizontal movement of the axles. By the physical arrangement described above, and as shown in the drawings, it must be recognized that when the wheels on a common axle move different distances the common axle is caused to undergo a torsional reaction which always assists the resilient means to support the load and oppose the displacement of the wheels relative to the frame. This is an ideal operating condition and it has many advantages, both from simplicity of construction and from more efficient utilization of the material required for the various components. In the various embodiments described there is a great advantage over conventional suspensions because the resilient elements are not subjected to bending loads, but operate either in substantially pure tension or compression. The axle, on the other hand, is subjected to torsional stress only when the wheels on a common axle move differentially because the path of wheel travel is an arc of a circle and not strictly vertical. Where the tension or compression load is involved it is easily appreciated that the load on the vehicle frame member 12 can be markedly increased because the suspension arms can be made stout enough to take very heavy loads, but the resilient members can be relative lightweight since each thereof is loaded in its most efficient strength of material manner, that is to say, in either substantially pure tension or compression. For example, a spring leaf as shown in FIG. 1 is formed with an initial arch so that when subjected only to the weight of the frame parts 12 and 13 it will maintain a desired arched condition. As load is increased on the side frame members 12 and 13 the axles 15 spread apart and the leaf spring 18 is subjected to tension which draws the initial arch in the spring more toward a straight line position as shown in dotted outline in FIG. 1. Under severe dynamic conditions the leaf spring will eventually become substantially flat and in this position the axles 15 will be prevented from spreading horizontally any further. With the spring 18 drawn out to a flat condition it will thereafter be impossible for the side frame 12 to strike the axles 15. At this point maximum bending stress has been reached, and any additional dynamic forces produces by any combination of vehicle speed and road conditions will produce only tension stresses in the lead spring, which makes the most of the strength of the material in service and may be chosen to resist dynamic loads to many times the maximum load that the side frame 12 is intended to carry without plastic yielding.

In the embodiments of FIGS. 3 and 8, it is appreciated that all of the elements and components of the suspension system, except the axles and the compression block of rubber, are subjected to tension stresses or to compression stresses. However, the compression member or block in each of these embodiments is most economically sized for the load to be resisted and its bulk is thereby considerably reduced.

It should now be readily understood in what manner the vehicle suspension system is intended to operate, and it should further be understood by those knowledgeable in this particular art in what manner the several embodiments will function to satisfy the object heretofore set forth.

What is claimed is:

1. In a vehicle suspension system for an over the road vehicle, a load bearing frame for the vehicle, a pair of wheel and axle assemblies each consisting of a pair of wheels on opposite ends of a common axle; and means operatively interconnecting each of said wheel and axle assemblies and said frame comprising arms pivotally mounted on said frame and attached to the axles of said pair of wheel and axle assemblies, and resilient means connected directly between said pair of wheel and axle assemblies, said resilient means opposing movement of said wheel and axle assemblies relative to said frame in response to road conditions and loading of said frame, and each of said common axles responding in torsional reaction to relative displacement of said pair of wheels thereon.

2. In a vehicle suspension system, a load bearing frame for the vehicle, tandem wheel and axle assemblies for the vehicle, load transmitting members operably connected to said frame and to each of said axles, said members acting to convert vertical movement of said frame in response to load conditions into displacement of said axles in a generally angular direction relative to said frame, said axles in said wheel and axle assemblies being responsive in torsion to differential movement of the wheels on said axles, and resilient means in the suspension system operative to yieldingly resist the relative horizontal displacement of said axles, said resilient means consisting of leaf spring means having an arched configuration in the vehicle no load condition with said axles at a predetermined spacing and responding to loading by elongating toward a substantially flat configuration with said axles at maximum angular displacement.

3. The suspension system of claim 2 wherein said load transmitting members are pivotally connected to said frame at spaced locations to support said frame from two different locations.

4. The suspension system of claim 2 wherein said load transmitting members are pivotally connected to said frame and the generally angular displacement of said axles has a vertical component in response to arcuate movement of said load transmitting members in a direction to increase the tandem spacing therebetween.

5. In a vehicle suspension system, a load bearing frame for the vehicle having longitudinal side members, two pairs of load transmitting members, each pair of members having first end portions connected to said side members in spaced relation along said side members, and each pair of said load transmitting members having second end portions, an axle connected to said second end portions of each pair of load transmitting members whereby differential movement between the load transmitting members of a pair thereof imparts torsional reaction in the connected axle, and resilient means operably connected between said axles to yieldingly resist axle displacement relative to each other as permitted by pivoting reaction of said load transmitting members in response to loads imposed on said frame, and said torsional reaction in each axle augmenting the resistance of said resilient means, and said resilient means consisting of leaf spring means having an arched configuration in the vehicle no load condition with said axles at a predetermined spacing and responding to loading by elongating into a substantially flat configuration with said axles at maximum angular displacement.

6. A vehicle frame suspension assembly including suspension arms connected to the vehicle frame, wheel supported axles connected to said suspension arms, and resilient means connected at its opposite ends adjacent said axles, said suspension arms moving arcuately about the pivot connections under load conditions on the frame to allow vertical displacement of the frame, said wheel supported axles under vertical displacement of the frame moving generally angularly and reacting in torsion for unequal movement of the wheels, and said resilient means consisting of leaf spring means having an arched configuration in the vehicle no load condition with said axles at a predetermined spacing and responding to vehicle loading by elongating toward a substantially flat configuration with said axles at a maximum horizontal spacing.

* * * * *